April 28, 1925.  
J. T. STANAGE  
BEET HARVESTER  
Filed Feb. 9, 1922
1,535,872
2 Sheets-Sheet 1
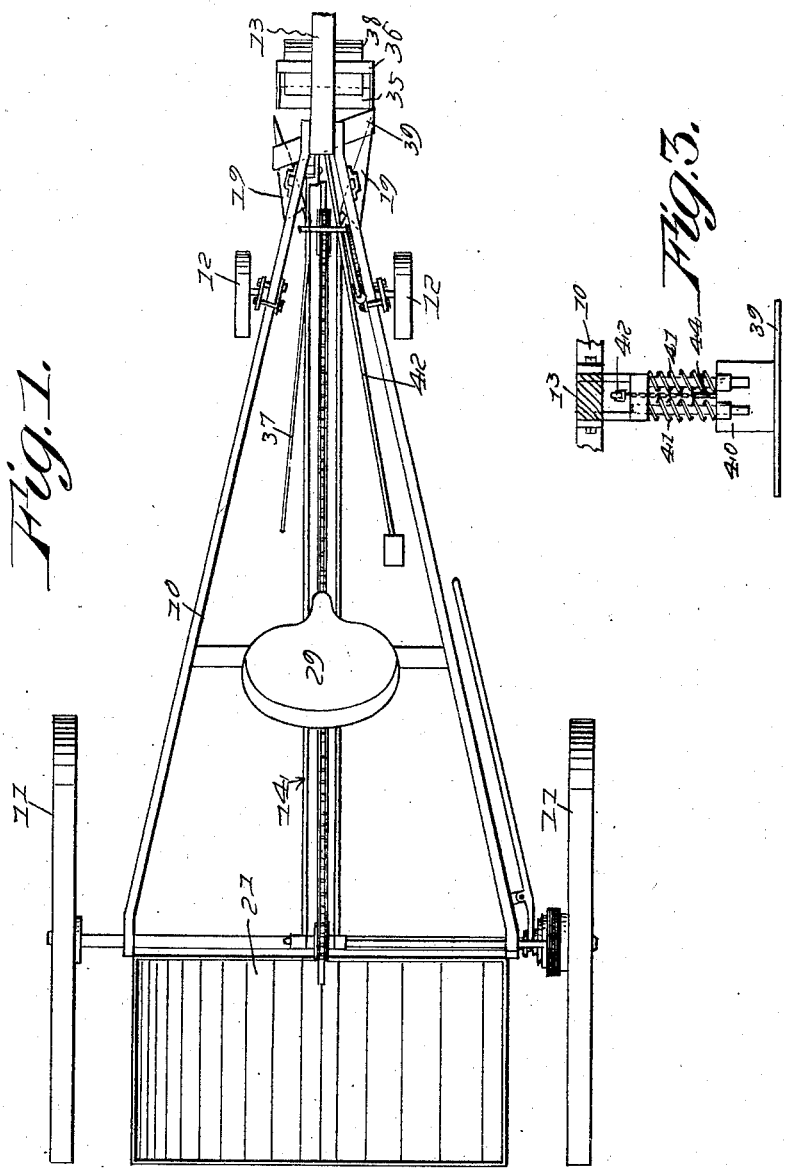
Inventor  
J. T. Stanage,  
By  
Attorney

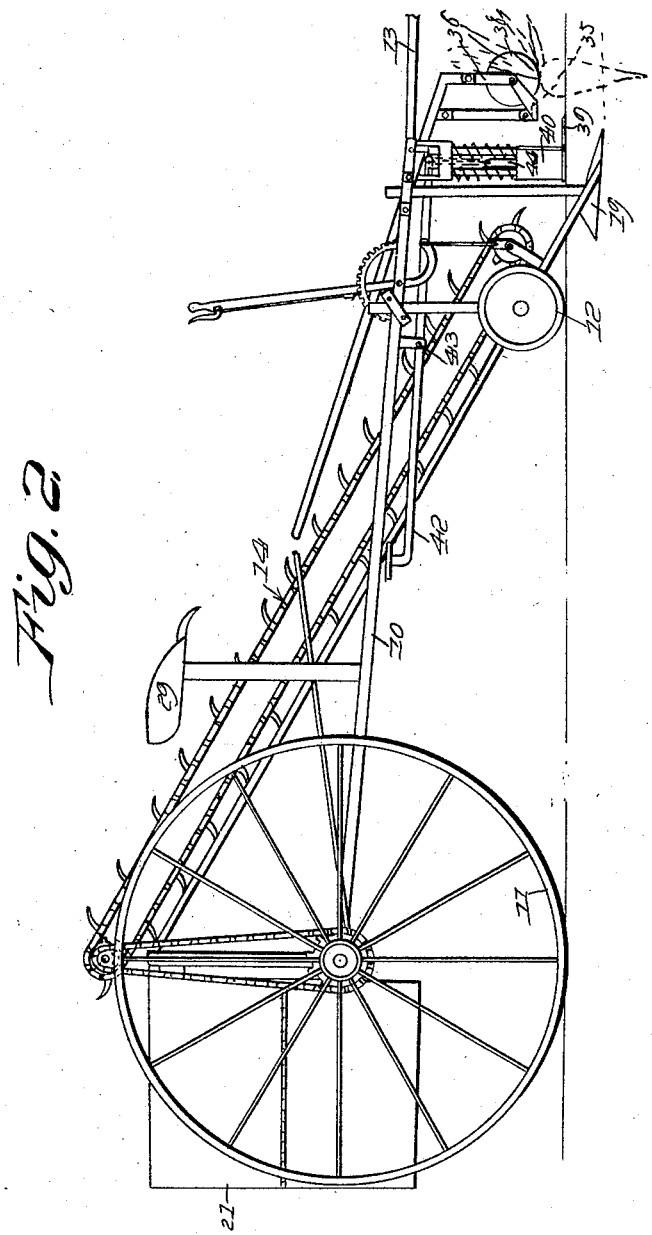

Patented Apr. 28, 1925.

1,535,872

UNITED STATES PATENT OFFICE.

JOHN T. STANAGE, OF THREE OAKS, MICHIGAN.

BEET HARVESTER.

Application filed February 9, 1922. Serial No. 535,393.

*To all whom it may concern:*

Be it known that JOHN T. STANAGE, a citizen of the United States of America, residing at Three Oaks, in the county of Berrien and State of Michigan, has invented new and useful Improvements in Beet Harvesters, of which the following is a specification.

The object of the invention is to provide a simple and efficient beet harvesting mechanism adapted for progressively topping, and heading beets and furthermore to provide a mechanism of which the several cooperative elements may readily be controlled by a single operator for whose convenience provision may be made for riding purposes under such conditions as to afford him a direct view of the topping, and heading elements; and with these objects in view the invention consists in a construction and combination of parts of which a preferred embodiment is shown in the accompanying drawings, wherein:—

Figure 1 is a plan view of a machine embodying the invention.

Figure 2 is a side view thereof.

Figure 3 is a detail elevational view of the beet head removing cutter and its supporting device, a portion of the frame being shown and the draft tongue shown in section.

The frame 10 having rear supporting and driving wheels 11 and front guiding wheels 12 is provided with a draft tongue 13 or its equivalent and supports a conveyor 14 and the lifting plows 19. The beets having been received and transported by the conveyor to the rear end of the machine are received by a chute 21.

The beet topping apparatus consists of an obliquely disposed blade 35 suspended by a hanger frame 36 from the front end of the wheel supported frame of the machine under the control of a hand lever 37 but normally regulated in its depth of cut, to properly position the blade to remove the beet top by a traveller consisting of a roller 38 carried by said hanger frame and designed to roll over the beets as indicated in Figure 2 to compensate for variations in the projection of the beet heads above the surface of the ground, it being desirable to remove the beet tops from the heads and then remove the beet heads by a succeeding cutter 39 which is arranged to follow the topping knife and which operates substantially in the plane of the surface of the ground in contact with which it is yieldingly held by means of a follower 40 actuated by springs 41. The aforesaid elevation of the heading knife by raising the follower in opposition to the tension of the springs 41 can be accomplished by means of a foot lever 42 fulcrumed at 43 and having connection with a stem 44 of said follower, the end of the foot pedal being within reach of the occupant of the seat 29.

By means of the apparatus as described it is possible to provide for the successive topping, heading and lifting of the beets in the order named notwithstanding the natural irregularities in the positions of the beets in the row and the extent of projection of the beet heads above the surface of the soil, it being obvious that the heading of the beets is required because of the fact that the portion of the beet which is herein referred to as the head and which projects above the surface of the soil in growth requires a different treatment from that which is embedded in the soil, and that whereas after a given adjustment of the parts they will accommodate themselves to the positions of the beets, to the extent as above indicated that the traveller 38 will guide the topping knife to only remove the top regardless of the projection of the beet head, and the heading knife will operate in the plane of the surface of the soil to remove that portion of the beet which projects in growth above the soil, any required variation in the positions of the parts may be secured from time to time by the operator as the occasion may arise, owing to the fact that the operation of the various elements is within clear view at all times of the occupant of the driver's seat 29.

Having described the invention, what is claimed as new and useful is:—

A beet harvesting apparatus having a wheel supported frame and beet heading means carried thereby and consisting of a blade, a follower carried by the frame and supporting the blade adjacent the surface of the soil traversed by the machine, a spring bearing upon the follower to maintain the blade at its lowermost position, a foot lever rockably mounted on the frame, and a stem carried by the follower and having a terminal flexible connection with the foot lever, whereby the follower and blade may be elevated upon depression of the foot lever.

In testimony whereof he affixes his signature.

JOHN T. STANAGE.